(12) United States Patent
Ganesan et al.

(10) Patent No.: US 9,372,746 B2
(45) Date of Patent: Jun. 21, 2016

(54) METHODS FOR IDENTIFYING SILENT FAILURES IN AN APPLICATION AND DEVICES THEREOF

(71) Applicant: Infosys Limited, Bangalore (IN)

(72) Inventors: Rajeshwari Ganesan, Bangalore (IN); Geetika Goel, Bangalore (IN)

(73) Assignee: INFOSYS LIMITED, Bangalore (IN)

( * ) Notice: Subject to any disclaimer, the term of this patent is extended or adjusted under 35 U.S.C. 154(b) by 0 days.

(21) Appl. No.: 14/493,101

(22) Filed: Sep. 22, 2014

(65) Prior Publication Data

US 2015/0154498 A1 Jun. 4, 2015

(30) Foreign Application Priority Data

Dec. 2, 2013 (IN) .......................... 5539/CHE/2013

(51) Int. Cl.
*G06F 11/00* (2006.01)
*G06F 11/07* (2006.01)

(52) U.S. Cl.
CPC .......... *G06F 11/079* (2013.01); *G06F 11/0706* (2013.01)

(58) Field of Classification Search
USPC ......................................................... 714/26
See application file for complete search history.

(56) References Cited

U.S. PATENT DOCUMENTS

| 7,237,140 | B2 | 6/2007 | Nakamura et al. | |
| 7,707,451 | B2 * | 4/2010 | Buskens | G06F 11/1417 706/19 |
| 7,870,439 | B2 | 1/2011 | Fujiyama et al. | |
| 8,117,496 | B2 * | 2/2012 | Bashir | G06F 11/1612 714/11 |
| 2004/0153703 | A1 * | 8/2004 | Vigue | G06F 11/3006 714/4.4 |
| 2004/0199824 | A1 * | 10/2004 | Harter | G06F 11/1008 714/30 |

FOREIGN PATENT DOCUMENTS

| EP | 1672505 A2 | 12/2005 |
| WO | 03093999 A2 | 11/2003 |

OTHER PUBLICATIONS

Nguyen M., et al., "Transition-by-Transition FSM Traversal for Reachability Analysis in Bounded Model Checking", IEEE, 2005, pp. 1068-1075.
Ural H., et al., "An EFSM-Based Passive Fault Detection Approach", FATES, LNCS 4581, 2007, pp. 335-350.
Cohen E., et al., "Probe Scheduling for Efficient Detection of Silent Failures", Blavatnik School of Computer Science, Jun. 19, 2007, pp. 1-23.
Marchetto A., et al., "State-Based Testing of Ajax Web Applications", Fondazione Bruno Kessler—IRST. 38050, Apr. 2008, pp. 1-10.
Pinho L., "Generating Asserts for Test Cases Efficiently", Faculdade De Engenharia Da Universidade Do Porto, Jun. 2013, pp. 1-88.

* cited by examiner

*Primary Examiner* — Sarai Butler
(74) *Attorney, Agent, or Firm* — LeClairRyan, a Professional Corporation

(57) ABSTRACT

A method system and computer program product are disclosed for identifying silent failures in an application, comprising of generating a finite state machine (FSM) model of the application based on an input data, extracting state specific invariants relevant to the generated FSM, performing a localized invariant violation check at each state of the generated FSM and upon detection of an invariant violation at any state of the FSM, logging the violation as a silent failure.

20 Claims, 3 Drawing Sheets

METHODS FOR IDENTIFYING SILENT FAILURES IN AN APPLICATION AND DEVICES THEREOF

This application claims the benefit of Indian Patent Application No. 5539/CHE/2013 filed Dec. 2, 2013, which is hereby incorporated by reference in its entirety.

FIELD OF THE INVENTION

The present invention relates, in general, to Identifying Silent Failures of an application using Finite State Machine based Invariant Analysis. More specifically, the invention relates to a methods for detecting silent failures using a combination of invariant violation analysis and finite state machine based analysis of the system and devices thereof.

BACKGROUND

Failures are unhandled conditions in an application. Failure diagnosis is the process of discovering the root cause of occurred failures based on a set of observed failure indications in the system. Fast and accurate diagnosis is essential to maintain the high availability of current computing systems. The study of failure diagnosis in computing systems has gone on for quite a long time. Traditional approaches rely on profound understandings of the underlying system architecture and operational principles to build system models or a set of rules for the diagnosis. As the increasing complexities of current computing systems, however, it becomes hard to build a meaningful model or precise rules to facilitate the failure diagnosis. As an alternative, statistical learning based approaches received more attentions in recent years. Those methods identify the failure root cause by analyzing and mining a large amount of monitoring data collected from the failure system to characterize the failure behavior. However, those methods only output some prioritized failure symptoms such as the high CPU consumptions or disk usages.

If an error condition arises but it is not detected and handled by a computer system gracefully, it is not categorized as a failure. The non-gracefully handled errors form the failures of the system. Many of these are explicitly observed in console or field failure logs like crash, hang or errors; while others are silent failures that could lead to silent data loss, silent data corruption or incorrect execution of workflow. It is important that any technique that is used for field failure analysis should not just indicate anomalies in the system but should be able to help human operators to localize these problems for faster diagnosis.

SUMMARY

A preferred embodiment of the present invention provides a method for identifying silent failures in an application, comprising of generating a finite state machine (FSM) model of the application based on an input data, extracting state specific invariants relevant to the generated FSM, performing a localized invariant violation check at each state of the generated FSM and upon detection of an invariant violation at any state of the FSM, logging the violation as a silent failure.

In another embodiment of the present invention the input data comprises execution states of the application, functional specification, information from audit trail logs and other logs, program code, user input and history data of the application in a production instance of the application.

In another embodiment of the present invention the extraction of state specific invariants is done from the input data.

In another embodiment of the present invention the invariant violation check is performed against predefined definition for the invariants.

In another embodiment of the present invention localized invariant analysis is performed independent of a set of traditional error handling measures and a set of failure handling measures.

In another embodiment of the present invention detection of the invariant violation at any state of the FSM comprises reporting one or more error and failure not identified previously through the set of traditional error handling and set of failure handling measures.

In another embodiment of the present invention upon detection of a non-violation of the FSM when a global invariant is violated, logging the error as a false positive.

According to another aspect of the present invention, there is provided a system for identifying silent failures in an application, comprising of a processor conFIG.d to generating a finite state machine (FSM) model of the application based on an input data, extracting state specific invariants relevant to the generated FSM, performing a localized invariant violation check at each state of the generated FSM and a log scripting unit conFIG.d for logging, upon detection of an invariant violation at any state of the FSM, the violation as a silent failure.

According to another aspect of the present invention, there is provided a system wherein input data is received through one or more of online entry by users, usage of existing file system or database, or extracted data from other subsystems over network.

According to another aspect of the present invention, there is provided a system wherein the input data comprises execution states of the application, functional specification, information from audit trail logs and other logs, program code, user input and history data of the application in a production instance of the application.

According to another aspect of the present invention, there is provided a system, wherein the extraction of state specific invariants is done from the input data.

According to another aspect of the present invention, there is provided a system wherein the invariant violation check is performed against predefined definition for the invariants.

According to another aspect of the present invention, there is provided a system wherein localized invariant analysis is performed independent of a set of traditional error handling measures and a set of failure handling measures.

According to another aspect of the present invention, there is provided a system wherein detection of the invariant violation at any state of the FSM comprises reporting one or more error and failure not identified previously through the set of traditional error handling and set of failure handling measures.

BRIEF DESCRIPTION OF THE DRAWINGS

The various embodiments of the invention will hereinafter be described in conjunction with the appended drawings, provided to illustrate, and not to limit, the invention, wherein like designations denote like elements, and in which.

DETAILED DESCRIPTION

The invention provides a method, system, and computer program product for an invariant analysis to be performed on an application and used to detect silent failures using a combination of invariant violation analysis and finite state machine based analysis of the system.

Figure 1:
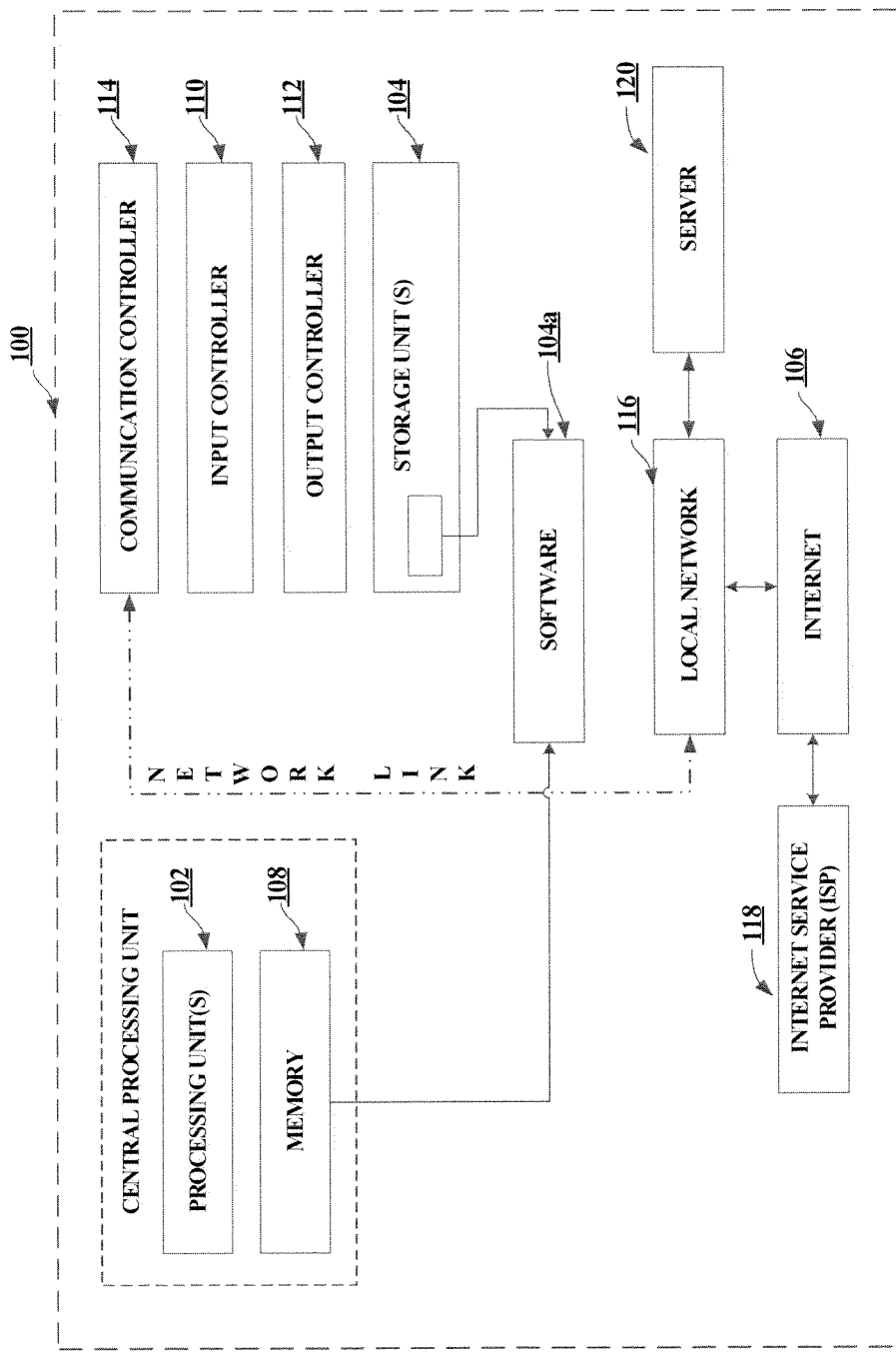
FIG. 1 illustrates a system in which various embodiments of the invention may be practiced, in accordance with an embodiment of the invention.

FIG. 1 is a block diagram of a computing device 100 to which the present disclosure may be applied according to an embodiment of the present disclosure. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid state storage device and a non-transitory storage device. The storage device 104 may contain software 104a which is a set of instructions (i.e. code). Alternatively, instructions may be stored in one or more remote storage devices, for example storage devices accessed over a network or the internet 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110, output controller 112, and any other devices (e.g., network controllers, sound controllers, etc.). Output controller 112 may be operatively coupled (e.g., via a wired or wireless connection) to a display device (e.g., a monitor, television, mobile device screen, touch-display, etc.) in such a fashion that output controller 112 can transform the display on display device (e.g., in response to modules executed). Input controller 110 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

Figure 2:
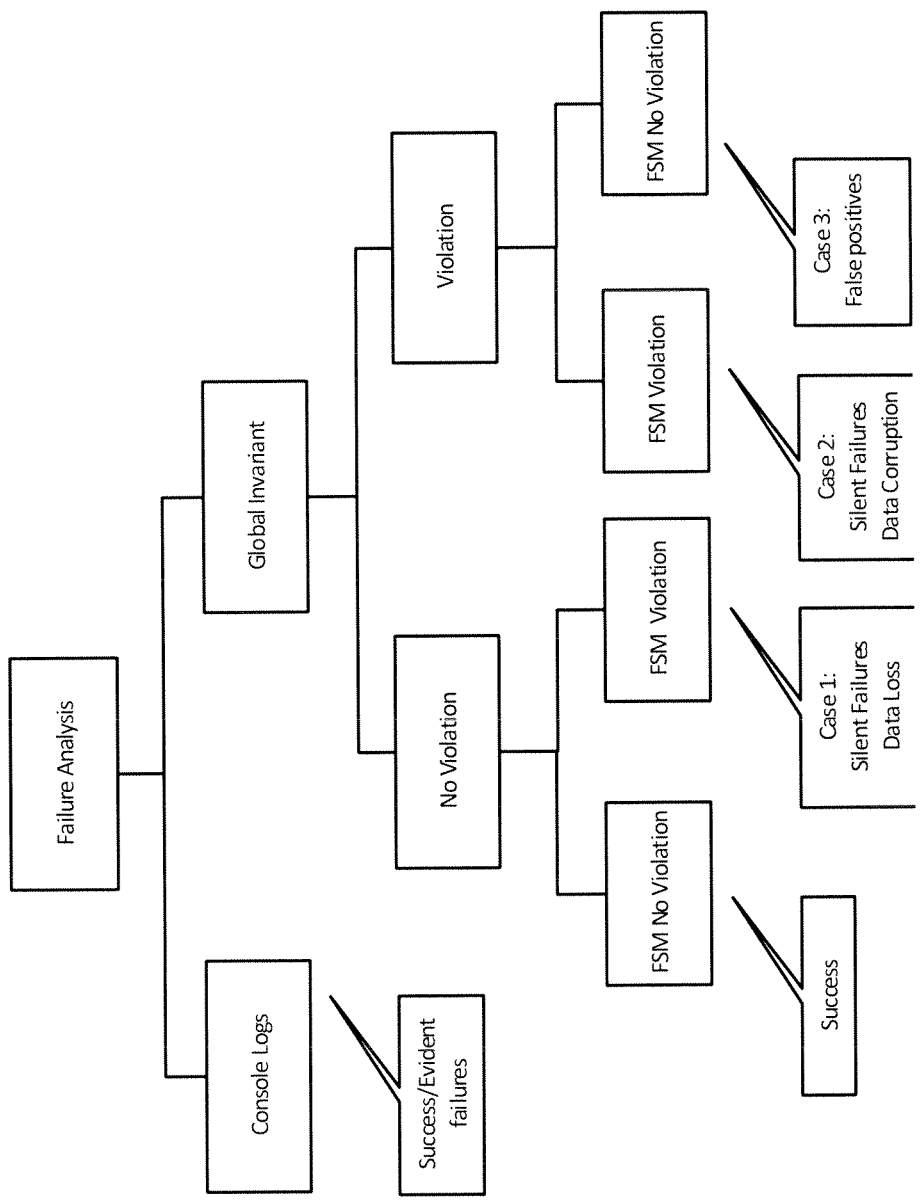
FIG. 2 illustrates an environment for the working of an invariant analysis and its possible outcomes.

FIG. 2 describes a system is described in a manner to only describe those failures that did not show up in the console logs, in other words, were silent failures. Firstly, we have the obvious case of success when there are no console failures. For this case, no invariant is violated and FSM is intact. In Case 1, even when no global invariant is violated, there was a violation of finite state properties during the program execution time (as recorded in the audit trail logs). This is very useful for finer grained view of the undetected or latent failures, which is a superset for silent failures. Hence the silent failure is detected (as shown in FIG. 2). This is crucial as silent failures cause data loss, data corruption and often result in customer dissatisfaction. The proposed method can be proactively applied to applications for faster detection and diagnosis of failures. Referring to the case where the invariant and FSM properties have both been violated during program execution as in Case 2. The information is extracted from audit trail logs. In this case, invariants are violated and hence point to silent failures. However, FSM analysis adds value on top of it by being able to confirm the failure and further localize the failure. Finally, in Case 3 where invariant is violated and hence a failure is flagged however FSM properties during program execution time are not being violated, this failure turns out to be a false positive.

Figure 3:
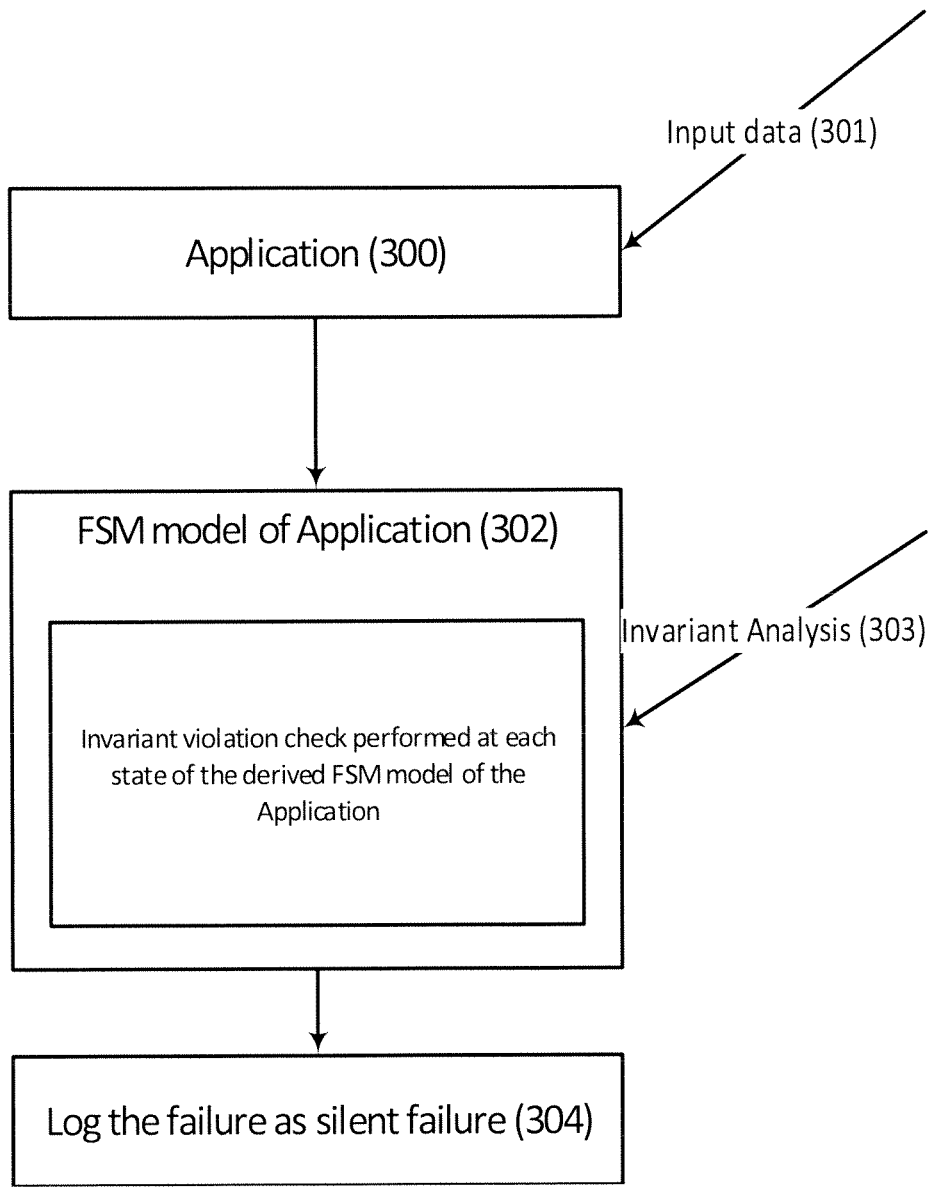
FIG. 3 illustrates an exemplary block diagram of a system for the method of detecting silent failures in an application under scrutiny.

FIG. 3 describes an embodiment of the present invention in terms of the steps being performed to identify and log failures occurring in an application which is converted into an FSM and assessed for invariant violations. This assessment and analysis is performed in the event that the application processing has thrown up an unexpected result while the console logs have not thrown an error. An application (300) under scrutiny for identification of silent failures is identified. An input data (201) comprising of data relevant and related to a production instance of the application is identified. This data may comprise of execution states of the application, functional specification, information from audit trail logs and other logs, program code, user input, monitored data about the application over a period of time and history data of the application. This input data is used to generate an FSM model of the Application (302). A set of state specific invariants relevant and related to the generated FSM are extracted and an invariant analysis (303) is performed at each state of the generated FSM model of the application. The output of this analysis is either at least one invariant violation being detected or detection of no invariant violations. This invariant violation, if detected, is then logged (304) as silent failure for the application.

In an exemplary embodiment of the present invention wherein an invariant analysis over the FSM model of the Application results in a scenario of no FSM violation being detected while a global invariant has been reported to be violated, this is considered as a failure of the type commonly termed as a False Positive. This error is logged and the event of this error occurring is marked as a False Positive.

The embodiments of the present invention are explained here below using examples from a real life SaaS platform. More specifically the three cases introduces through explanation of FIG. 2 are exemplified.

The platform under study is a SaaS application that acts as a common ground for communication between multiple stakeholders of the consumer product goods industry. These stakeholders could be manufacturers, wholesalers, dealers and retailers. Sharing of their inventory, sales and promotion information amongst each other is obtained through this platform. The platform processes files obtained from different clients by harmonizing, sanitizing and transforming their data and finally committing it to a master repository. Each of these processing steps is performed by services referred to as processing nodes. These services are standalone and do not call or trigger other services by themselves. The processing states and their transitions are maintained in two key audit trail logs PRC_SUMMARY and PRC_DETAILS. The Finite States were derived for the application using the application data and they were:

File Received, File Format Validation and File Field validation, Moved to Staging and Data Transformed, Data Commit, and File Archival for Audit as shown in table 1.

State specific invariants were defined for each of the extracted states as follows:

TABLE 1

| # | Processing Node | Status_Code in PRC_DETAILS | Status_Code in PRC_SUMMARY | Failure_Reason |
|---|---|---|---|---|
| 1 | File Received | OK | In-Process | — |
|   |  | LATE | User-Error | — |
|   |  | FAIL | User-Error | — |
| 2 | File Format Validation and File Field Validation | OK | In-Process | — |
|   |  | FAIL | User-Error | Invalid File or Invalid Column |
| 3 | Moved to staging And Data transformed | OK | In-Process | — |
|   |  | FAIL | Exception | System Related Errors |
| 4 | Data Commit | OK | Processed | — |
|   |  | FAIL | Exception | System or database related errors |
| 5 | File Archival for Audit | OK | Processed | — |
|   |  | FAIL | — (Does not matter) | — |

Any stage experiencing "User_Error" had to be followed by an entry for "Notify customer to resend" in the trace logs.

The global invariants for the same application were defined as follows:
1. Number of files in PRC_SUMMARY=Number of files in PRC_DETAILS
2. Status_Code values in PRC_SUMMARY: Processed, User_Error, Exception, In_Process.
3. Status_Code values in PRC_DETAILS: OK, FAIL, LATE.

With these as the definitions, each case from FIG. 2 is explained as below:

Case 1: Global Invariant was not violated, but FSM was violated.

There were 30 files found in the system, where the FSM definition number 2 was found violated. These 30 files had Status_Code of "FAIL" in the PRC_SUMMARY table, but this was not accompanied with the entry for "Notify customer to resend" in the trace logs. Hence, the FSM was flagged off as violated.

However, since none of the global invariants were violated (Status value was a valid one—User-Error), this could have been missed from any failure detection.

This was a case of silent data corruption, where the customer was unaware that his file has been rejected from processing and hence didn't resend the corrected file. In other words, the system had no trace of the file.

Case 2: Global Invariant was violated and FSM was also violated.

20 cases where global invariants 1 and 3 were violated were encountered. These files had a status_code "Blank" in the PRC_DETAILS table and had no entry in the PRC_SUMMARY table.

In addition, the FSM was violated for these files, as Status_Code Blank was unacceptable plus there was no entry for "Notify customer to resend" in the trace logs. This represents a case of silent data failure.

As is clear, the global invariant was violated and so was the FSM. Both invariant violation and FSM violation confirm to silent failures of such kind Case 3: Global invariant was violated, but FSM was not violated (False Positive).

Global invariant 1 was found violated for 123 files, however FSM was found not violated for 42 of these cases. The Status_Code field was empty for these files, which meant that they encountered some anomaly during processing and hence were considered failed. However, FSM analysis showed that in spite of Status_Code being empty in PRC_DETAIL, the corresponding Status_Code in PRC_SUMMARY was valid—"Processed" for 2 of them and "User Error" for 40. Upon closer analysis, we also found that such a situation occurred when the file had already crossed the "Data Commit" stage and the anomaly had happened in the "File Archival" stage. This stage was not crucial for the regular workflow or any downstream functionality of the file and could be redone independent of the file processing.

| Global Invariants | Violations |
|---|---|
| Status_Code field in PRC_DETAILS in [OK, FAIL, LATE] | 123 |
| FSM Analysis for above case False Positives | |
| Status in PRC_DETAILS = "" Status in PRC_SUMMARY = Processed | 2 |
| Status in PRC_DETAILS = "" Status in PRC_SUMMARY = User_Error | 40 |

As is clear, in spite of Global Invariant violation, the FSM analysis helped in identifying false positives.

As is clear in the above, the global invariant definition is not enough to determine whether a failure occurred or not. Invariant violation, combined with FSM violation check is important to determine the correct state of the system.

The computer system executes a set of program instruction means that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention.

The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for identifying silent failures in an application, comprising:
generating, by a failure identification computing device, a Finite State Machine (FSM) model of the application based on an input data;
extracting, by the failure identification computing device, state specific invariants relevant to the generated FSM;
performing, by the failure identification computing device, a localized invariant violation check at each state of the generated FSM to detect an invariant violation; and
upon detection of the invariant violation at any state of the FSM, logging, by the failure identification computing device, the violation as a silent failure.

2. The method of claim 1, wherein the input data comprises execution states of the application, functional specification, information from audit trail logs and other logs, program code, or user input and history data of the application in a production instance of the application.

3. The method of claim 1, wherein the extraction of state specific invariants is done from input data.

4. The method of claim 1, wherein the invariant violation check is performed against a predefined definition for the invariants.

5. The method of claim 1, wherein the localized invariant analysis is performed independent of a set of traditional error handling measures and a set of failure handling measures.

6. The method of claim 1, wherein detection of the invariant violation at any state of the FSM comprises:
reporting, by the failure identification computing device, one or more error and failure not identified previously through the set of traditional error handling and set of failure handling measures.

7. The method of claim 1, wherein upon detection of a non-violation of the FSM when a global invariant is violated, logging the error as a false positive.

8. A failure identification computing device comprising:
a processor; and
a memory coupled to the processor which is configured to be capable of executing programmed instructions comprising and stored in the memory to:
generate a Finite State Machine (FSM) model of the application based on an input data;
extract state specific invariants relevant to the generated FSM;
perform a localized invariant violation check at each state of the generated FSM to detect an invariant violation; and
upon detection of the invariant violation at any state of the FSM, log the violation as a silent failure.

9. The device of claim 8, wherein input data is received through one or more of online entry by users, usage of existing file system or database, or extracted data from other subsystems over network.

10. The device of claim 8, wherein the input data comprises execution states of the application, functional specification, information from audit trail logs and other logs, program code, or user input and history data of the application in a production instance of the application.

11. The device of claim 8, wherein the extraction of state specific invariants is done from input data.

12. The device of claim 8, wherein the invariant violation check is performed against a predefined definition for the invariants.

13. The device of claim 8, wherein the localized invariant analysis is performed independent of a set of traditional error handling measures and a set of failure handling measures.

14. The device of claim 8, wherein detection of the invariant violation at any state of the FSM comprises reporting one or more error and failure not identified previously through the set of traditional error handling and set of failure handling measures.

15. A non-transitory computer readable medium having stored thereon instructions for identifying silent failures in an application which when executed by a processor, cause the processor to perform steps comprising:
generating a Finite State Machine (FSM) model of the application based on an input data;
extracting state specific invariants relevant to the generated FSM;
performing a localized invariant violation check at each state of the generated FSM to detect an invariant violation; and
upon detection of the invariant violation at any state of the FSM, logging the violation as a silent failure.

16. The medium of claim 15, wherein the input data comprises execution states of the application, functional specification, information from audit trail logs and other logs, program code, or user input and history data of the application in a production instance of the application.

17. The medium of claim 15, wherein the extraction of state specific invariants is done from input data.

18. The medium of claim 15, wherein the invariant violation check is performed against a predefined definition for the invariants.

19. The medium of claim 15, wherein the localized invariant analysis is performed independent of a set of traditional error handling measures and a set of failure handling measures.

20. The medium of claim 15, wherein upon detection of a non-violation of the FSM when a global invariant is violated, logging the error as a false positive.

* * * * *